US011005861B2

(12) United States Patent
Achituve et al.

(10) Patent No.: US 11,005,861 B2
(45) Date of Patent: May 11, 2021

(54) COMBINING STATIC AND DYNAMIC MODELS FOR CLASSIFYING TRANSACTIONS

(71) Applicant: EMC IP Holding Company LLC, Hopkinton, MA (US)

(72) Inventors: Idan Achituve, Ganei Tikva (IL); Maya Herskovic, Tel Aviv (IL); Liat Ben-Porat, Tel Aviv (IL); Tal Aboudy, Kiryat Ono (IL); Or Navri, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 303 days.

(21) Appl. No.: 16/223,289

(22) Filed: Dec. 18, 2018

(65) Prior Publication Data
US 2020/0195663 A1 Jun. 18, 2020

(51) Int. Cl.
H04L 29/06 (2006.01)
G06N 20/00 (2019.01)
G06N 3/08 (2006.01)

(52) U.S. Cl.
CPC .......... *H04L 63/1416* (2013.01); *G06N 3/08* (2013.01); *G06N 20/00* (2019.01)

(58) Field of Classification Search
CPC ............. H04L 63/1416; H04L 63/1425; H04L 63/1433; H04L 63/1466; H04L 63/20; H04L 63/145; G06N 20/00; G06N 3/08
See application file for complete search history.

(56) References Cited

U.S. PATENT DOCUMENTS

| 6,324,647 B1* | 11/2001 | Bowman-Amuah | ......................... H04L 63/0227 709/223 |
| 8,291,475 B2* | 10/2012 | Jackson | .................. G06F 21/54 726/4 |
| 8,887,281 B2* | 11/2014 | Honig | ..................... H04L 63/14 726/23 |
| 9,311,476 B2* | 4/2016 | Stolfo | ............... H04L 29/06884 |
| 9,356,957 B2* | 5/2016 | Keromytis | ............ H04L 63/145 |

(Continued)

FOREIGN PATENT DOCUMENTS

WO 2007149064 A1 12/2007

*Primary Examiner* — Hosuk Song
(74) *Attorney, Agent, or Firm* — Ryan, Mason & Lewis, LLP

(57) ABSTRACT

A method includes generating a static model for classifying transactions of a designated type, the static model being trained using predefined input data corresponding to a first set of features generic to transactions of the designated type, and generating a dynamic model for classifying transactions of the designated type, the dynamic model being trained using dynamic input data corresponding to a second set of features specific to subsets of transactions of the designated type. The method also includes combining the static and dynamic models to generate a combined model, detecting transactions of the designated type between client devices and an enterprise system, and utilizing the combined model to classify a given detected transaction between a given client device and the enterprise system as potentially malicious or benign. The method further includes modifying processing of the given detected transaction responsive to classifying the given detected transaction as potentially malicious.

20 Claims, 9 Drawing Sheets

(56) References Cited

U.S. PATENT DOCUMENTS

| | | | |
|---|---|---|---|
| 9,998,483 B2* | 6/2018 | Sukhomlinov | H04L 63/1416 |
| 10,721,239 B2* | 7/2020 | Koottayi | H04L 63/1416 |
| 2004/0088116 A1 | 5/2004 | Khalil et al. | |
| 2005/0021485 A1 | 1/2005 | Nodelman et al. | |
| 2014/0046880 A1 | 2/2014 | Breckenridge et al. | |

* cited by examiner

| VALUE | # OF FRAUDULENT INSTANCES | # OF GENUINE INSTANCES |
|---|---|---|
| 1 | 20 | 1 |
| 2 | 8 | 4 |
| 3 | 5 | 7 |
| 4 | 5 | 20 |
| 5 | 3 | 30 |
| 6 | 7 | 100 |
| 7 | 10 | 400 |
| 8 | 50 | 900 |

303-1

| VALUE | # OF FRAUDULENT INSTANCES | # OF GENUINE INSTANCES |
|---|---|---|
| 1 | 20 | 1 |

303-2

| VALUE | # OF FRAUDULENT INSTANCES | # OF GENUINE INSTANCES |
|---|---|---|
| 2 | 8 | 4 |
| 3 | 5 | 7 |

303-3

| VALUE | # OF FRAUDULENT INSTANCES | # OF GENUINE INSTANCES |
|---|---|---|
| 4 | 5 | 20 |
| 5 | 3 | 30 |
| 6 | 7 | 100 |
| 7 | 10 | 400 |
| 8 | 50 | 900 |

COMBINING STATIC AND DYNAMIC MODELS FOR CLASSIFYING TRANSACTIONS

FIELD

The field relates generally to information security, and more particularly to classification of transactions.

BACKGROUND

As transactions with enterprise systems are increasingly digitized, the task of classifying such transactions is becoming more challenging. With digitization, enterprise systems face both an increase in the number of transactions and in the number of channels over which transactions take place. For example, new and different types of devices including Internet of Things (IoT) devices continually provide new channels for transacting with enterprise systems. Classifying transactions is important for a number of tasks, such as in evaluating whether transactions represent a security threat for an enterprise system and its users. Security threats may arise, for example, from fraudulent or malicious transactions that present risks that can expose the enterprise system and its users or devices.

SUMMARY

Illustrative embodiments of the present invention provide techniques for combining a static model trained on predefined input data that is generic to a particular type of transactions with a dynamic model trained on dynamic input data that is specific to subsets of transactions of that type, and for utilizing the combined model to classify transactions of that type. Embodiments advantageously provide for improved classification performance by enabling automatic adaption of the static model using the dynamic model to account for new and varying input data.

In one embodiment, a method comprises generating a static model for classifying transactions of a designated type, the static model being trained using predefined input data corresponding to a first set of features, the first set of features being generic to transactions of the designated type, and generating a dynamic model for classifying transactions of the designated type, the dynamic model being trained using dynamic input data corresponding to a second set of features, the second set of features being specific to one or more subsets of transactions of the designated type. The method also comprises combining the static model and the dynamic model to generate a combined model for classifying transactions of the designated type, detecting one or more transactions of the designated type between one or more client devices and an enterprise system, and classifying, utilizing the combined model, a given one of the detected transactions between a given one of the client devices and the enterprise system as one of potentially malicious and benign. The method further comprises modifying processing, by at least one of the given client device and the enterprise system, of the given detected transaction responsive to classifying the given detected transaction as potentially malicious. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIG. 3 depicts entropy-based discretization of features in an illustrative embodiment.

DETAILED DESCRIPTION

Figure 1:
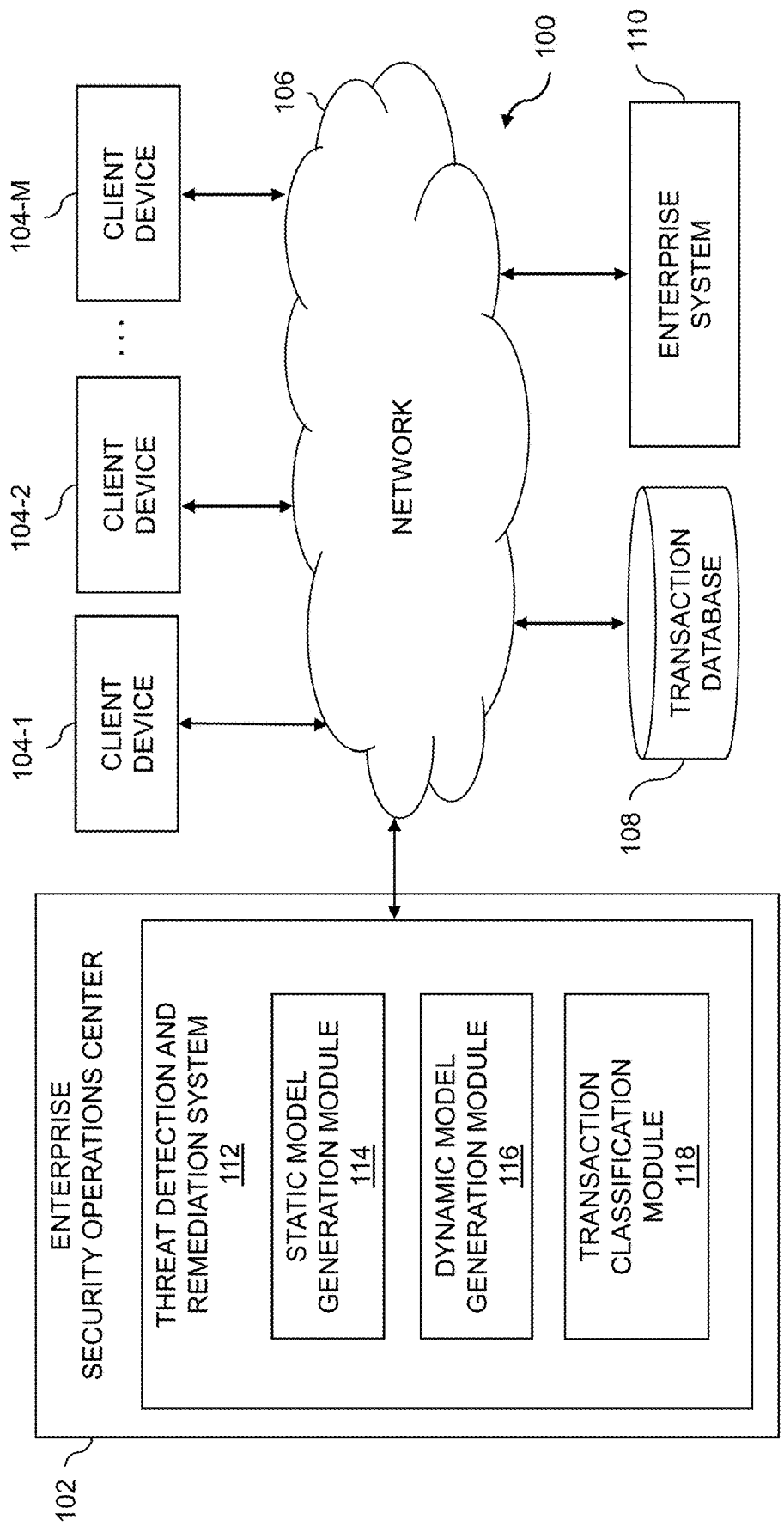
FIG. 1 is a block diagram of an information processing system for classifying transactions using a combined model in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

In various domains or application areas, it is challenging to stay ahead of the ever-changing landscape of possible threats. For example, fast evolving digitalization continues to provide new ways to transact or otherwise interact with enterprise systems. This has implications for various domains or application areas, including but not limited to fraud detection in the financial transactions domain, user authentication in the computer security domain, counterfeit detection in the supply chain domain, etc.

A Naïve Bayes framework may be used to provide data modeling, but the Naïve Bayes algorithm requires pre-knowledge and heavy modeling of input data. Illustrative embodiments provide techniques for enabling the use of a Naïve Bayes framework in application areas where it is desired to handle flexible and dynamic input data. In some embodiments, the benefits of the Naïve Bayes algorithm in classification (e.g., fraudulent transaction detection, validating user authentication, counterfeit detection, etc.) are provided in a framework which utilizes a dynamic algorithm or model for adjusting to new types of input data without the need for manual intervention or re-training of a static core model.

In some embodiments, a static core model that addresses common and generic input data relevant in most or all types of transactions handled by an enterprise system (e.g., financial transactions for a bank or other financial institution or enterprise) is combined with a dynamically created model that addresses unique input data provided by different users for different types of transactions (e.g., different types of financial transactions from different customers of a financial institution or enterprise).

Dynamic model creation is accomplished through: (i) the discretization of numeric data (e.g., using entropy-based discretization); (ii) feature creation, which may rely on pre-defined profile types proven to work efficiently for a particular use case (e.g., for anti-fraud or fraud detection); and (iii) feature selection, which may be based on an evaluation process that utilizes a heuristic search algorithm (e.g., a genetic algorithm).

FIG. 1 shows an information processing system 100 configured in accordance with an illustrative embodiment. The information processing system 100 is assumed to be built on at least one processing platform and provides functionality for classifying transactions using a combined model. In this embodiment, the system 100 more particularly comprises an enterprise security operations center (SOC) 102 and a plurality of client devices 104-1, 104-2, . . . 104-M, collectively referred to herein as client devices 104. The client devices 104 are coupled to a network 106. Also coupled to the network 106 is a transactions database 108, which may store various information relating to different types of transactions, including static or pre-defined input data that is generic to all or most transactions of a given type and dynamic input data that is specific to one or more subsets of transactions of the given type.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The transactions database 108, as discussed above, is configured to store and record information relating to one or more types of transactions. The information stored in transactions database 108 may include predefined input data for a given type of transactions, where the predefined input data is generic to or applicable to all or most transactions of the given type. In the financial domain, for example, such predefined input data may include information such as transaction amount, transaction beneficiary, source account, etc. The information stored in the transactions database 108 may also or alternatively include dynamic input data for the given type of transactions, where the dynamic input data represents custom data elements that vary according to a relevant use case (e.g., the dynamic input data may be relevant to only a subset of transactions of the given type). Again, continuing with the example of input data in the financial domain, the dynamic input data may include information relating to the device used to perform a transaction of the given type, how often that device is used to perform transactions of the given type, how many different users utilize that device to perform transactions of the given type, the application programming interface (API) or other channels used for transactions of the given type, etc.

The transactions database 108 in some embodiments is implemented using one or more storage systems or devices associated with the enterprise SOC 102. In some embodiments, one or more of the storage systems utilized to implement the transactions database 108 comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

The client devices 104 are configured to access or otherwise utilize an enterprise system 110. The enterprise system 110 may represent, for example, a financial institution or a collection of financial institutions, an authentication system, a business or other enterprise infrastructure, a cloud computing infrastructure, etc.

In the present embodiment, alerts or notifications generated by a threat detection and remediation system 112 of the enterprise SOC 102 are provided over network 106 to client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 112. For example, a given security or host agent may comprise a mobile telephone equipped with a mobile application configured to receive alerts from the enterprise SOC 102 or the threat detection and remediation system 112 and to provide an interface for the security agent to select particular remedial measures for responding to the alert or notification. Examples of such remedial measures may include blocking one or more transactions between one or more of the client devices 104 and the enterprise system 110, requiring user input or authentication by one or more of the client devices 104 or the enterprise system 110 to perform one or more transactions, triggering further review of one or more transactions between the client devices 104 and the enterprise system 110, etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 112. As will be described in further detail below, the threat detection and remediation system 112 is configured to combine static and dynamic models for classifying transactions.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises a static model generation module 114, a dynamic model generation module 116 and a transaction classification module 118.

The static model generation module 114 is configured to generate a static model for classifying transactions of a designated type. As used herein, the term "generate" or "generating" is defined broadly to encompass instantiating or otherwise selecting or obtaining. The static model is trained using predefined input data that corresponds to a first set of features, the first set of features being generic to transactions of the designated type. The dynamic model generation module 116 is configured to generate a dynamic model for classifying transactions of the designated type. The dynamic model is trained using dynamic input data corresponding to a second set of features, the second set of features being specific to one or more subsets of transactions of the designated type.

The transaction classification module 118 is configured to combine the static model and the dynamic model to generate a combined model for classifying transactions of the designated type. Responsive to the threat detection and remediation system 112 detecting one or more transactions of the designated type between the client devices 104 and the enterprise system 110, the transaction classification module 118 is configured to utilize the combined model to classify the detected transactions as one of potentially malicious and benign. As used herein "potentially malicious" is a classification which triggers further action, and may represent a fraudulent financial or user authentication transaction, a malicious data transfer or messaging transaction (e.g., a virus, malware, adware), etc. The term "benign" is a classification which does not trigger further action, and may represent a genuine financial or user authentication transaction, a non-malicious data transfer or messaging transaction, etc.

Responsive to the transaction classification module 118 classifying a given transaction between one or more of the client devices 104 and the enterprise system 110 as being potentially malicious, the threat detection and remediation system 112 modifies processing of the given transaction. This may involve, by way of example, blocking or stopping processing of the given transaction, requiring user input or authentication before proceeding with or completing the given transaction, triggering further review of the given transaction by providing a notification via one or more security agents as described above, requiring that the given transaction be executed or completed in a sandboxed or other protected application environment on the client devices 104 and enterprise system 110, etc.

It is to be appreciated that the particular arrangement of the enterprise SOC 102, threat detection and remediation system 112, static model generation module 114, dynamic model generation module 116 and transaction classification module 118 illustrated in the FIG. 1 embodiment is presented by way of example only, and alternative arrangements can be used in other embodiments. As discussed above, for example, the enterprise SOC 102, threat detection and remediation system 112, static model generation module 114, dynamic model generation module 116 and transaction classification module 118 may in some embodiments be implemented internal to one or more of the client devices 104. As another example, the functionality associated with the static model generation module 114, dynamic model generation module 116 and transaction classification module 118 may be combined into one module, or separated across more than three modules with the multiple modules possibly being implemented with multiple distinct processors or processing devices.

At least portions of the static model generation module 114, dynamic model generation module 116 and transaction classification module 118 may be implemented at least in part in the form of software that is stored in memory and executed by a processor.

It is to be understood that the particular set of elements shown in FIG. 1 for classifying transactions utilizing combined static and dynamic models is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC), a security analytics system, a security information and event management (SIEM) system, a Governance, Risk and Compliance (GRC) system, etc.

The threat detection and remediation system 112 and other portions of the system 100, as will be described in further detail below, may be part of cloud infrastructure such as an Amazon Web Services (AWS) system. Other examples of cloud-based systems that can be used to provide the threat detection and remediation system 112 include Virtustream Enterprise Cloud, Virtustream Storage Cloud, Google Cloud Platform (GCP) and Microsoft Azure.

The threat detection and remediation system 112 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The client devices 104 and threat detection and remediation system 112 or components thereof (e.g., static model generation module 114, dynamic model generation module 116 and transaction classification module 118) may be implemented on respective distinct processing platforms, although numerous other arrangements are possible. For example, in some embodiments at least portions of the threat detection and remediation system 112 and one or more of the client devices 104 are implemented on the same processing platform. A given client device (e.g., 104-1) can therefore be implemented at least in part within at least one processing platform that implements at least a portion of the threat detection and remediation system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, threat detection and remediation system 112 or portions or components thereof, to reside in different data centers. Numerous other distributed implementations are possible. The threat detection and remediation system 112 can also be implemented in a distributed manner across multiple data centers.

Additional examples of processing platforms utilized to implement threat detection and remediation system 112 in illustrative embodiments will be described in more detail below in conjunction with FIGS. 6 and 7.

It is to be appreciated that these and other features of illustrative embodiments are presented by way of example only, and should not be construed as limiting in any way.

An exemplary process for classifying transactions utilizing combined static and dynamic models will now be described in more detail with reference to the flow diagram of FIG. 2. It is to be understood that this particular process is only an example, and that additional or alternative processes for classifying transactions utilizing combined static and dynamic models can be carried out in other embodiments.

In this embodiment, the process includes steps 200 through 210. These steps are assumed to be performed by the threat detection and remediation system 112 utilizing the static model generation module 114, dynamic model generation module 116 and transaction classification module 118. The process begins with step 200, generating a static model for classifying transactions of a designated type. The static model is trained using predefined input data corresponding to a first set of features, the first set of features being generic to transactions of the designated type. In step 202, a dynamic model for classifying transactions of the designated type is generated. The dynamic model is trained using dynamic input data corresponding to a second set of features, the second set of features being specific to one or more subsets of transactions of the designated type. The dynamic input data used to train the dynamic model generated in step 202 may, in some embodiments, be obtained from one or more APIs associated with one or more Internet of Things (IoT) channels for communication between the one or more client devices and the enterprise system.

Generating the dynamic model in step 202 may comprise obtaining the dynamic input data, where the dynamic input data comprises: (i) categorical data; and (ii) continuous numerical data associated with a set of transactions of the designated type, and discretizing the continuous numerical data to generate discretized numeric data. Discretizing the continuous numerical data may comprise utilizing entropy-based discretization to select a given set of cutoffs in the continuous numerical data with a highest distinction between first and second classes of transactions of the designated type. The first class of transactions of the designated type may comprise benign transactions and the second class of transactions of the designated type may comprise potentially malicious transactions. The entropy-based discretization may analyze two or more different sets of cutoffs and utilize an information gain measure to select the given set of cutoffs which provides a greatest reduction in entropy.

Generating the dynamic model in step 202 may further comprise generating a new set of features using the categorical data and the discretized numeric data based at least in part on a set of generic profiles for transactions of the designated type. The set of generic profiles may be determined using at least one of domain expert knowledge for transactions of the designated type and a knowledge base for transactions of the designated type.

Step 202 may further comprise selecting a subset of the generated new set of features as the second set of features based at least in part on a determination of which of the new set of features when combined together and with the first set of features improve accuracy of classification of transactions of the designated type. Selecting the subset of the generated new set of features as the second set of features may comprise utilizing at least one of a filter approach, a wrapper approach and an embedding approach. Utilizing the wrapper approach may comprise using a heuristic search algorithm such as a genetic algorithm. The genetic algorithm may include performing two or more iterations of: evaluating performance of the static model combined with a plurality of different subsets of the generated new set of features; selecting two or more of the subsets of the generated new set of features based at least in part on the evaluated performance; applying crossover between the two or more selected subsets of the generated new set of features to generate one or more new subsets of the generated new set of features; performing mutation by selectively activating and deactivating respective ones of the features in the two or more selected subsets of the generated new set of features and the one or more new subsets of the generated new set of features; and replacing the plurality of different subsets of the generated new set of features with the mutated two or more selected subsets of the generated new set of features and the one or more new subsets of the generated new set of features.

The static model generated in step 200 and the dynamic model generated in step 202 are combined to generate a combined model for classifying transactions of the designated type in step 204. The combined model, in some embodiments, utilizes a Multinomial Naïve Bayes algorithm.

In other embodiments, the combined model may comprise a neural network machine learning model, or combinations of a neural network machine learning model and a model that utilizes a Multinomial Naïve Bayes algorithm.

Figure 2:
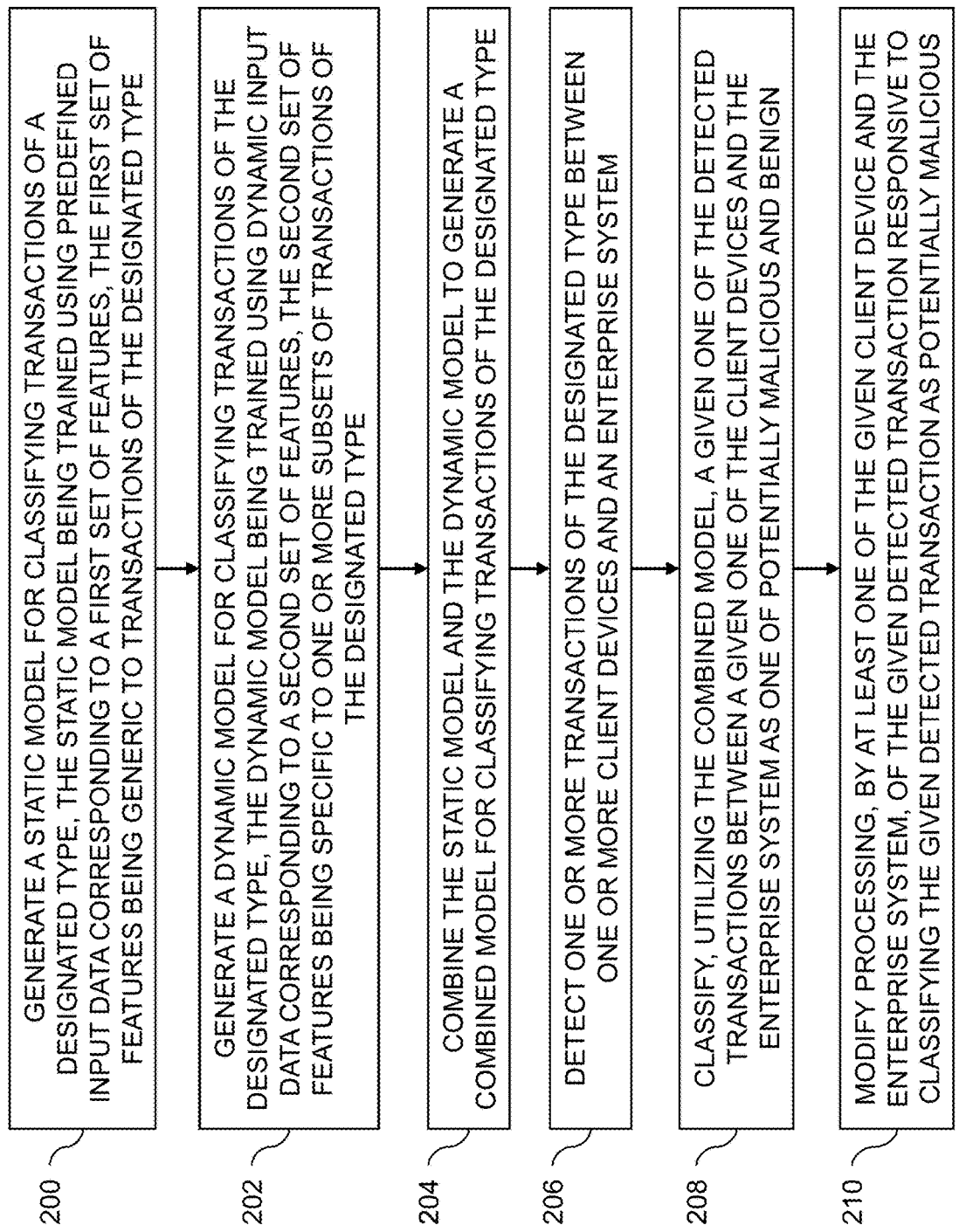
FIG. 2 is a flow diagram of an exemplary process for classifying transactions using a combined model in processing nodes in an illustrative embodiment.

The FIG. 2 process continues with step 206, detecting one or more transactions of the designated type between client devices 104 and enterprise system 110. In step 208, a given one of the detected transactions between a given one of the client devices 104 and the enterprise system 110 is classified utilizing the combined model generated in step 204. Responsive to classifying the given detected transaction as potentially malicious, processing of the given detected transaction by at least one of the given client device 104 and the enterprise system 110 is modified in step 210. Modifying processing in step 210 may include, but is not limited to, one or more of: blocking or stopping processing of the given transaction; requiring user input or authentication before proceeding with or completing the given transaction; triggering further review of the given transaction by providing a notification via one or more security agents as described above; requiring that the given transaction be executed or completed in a sandboxed or other protected application environment on at least one of the given client device 104 and the enterprise system 110; etc.

In some embodiments, the transactions of the designated type comprise financial transactions. In such embodiments, the enterprise system may comprise one or more financial institutions, and classifying the given detected transaction in step 208 utilizing the combined model generated in step 204 may comprise classifying the given detected transaction as one of genuine (e.g., benign) and fraudulent (e.g., potentially malicious).

In other embodiments, the transactions of the designated type may comprise user authentication transactions (e.g., requests to access one or more protected resources of the enterprise system or protected resources of the client devices, etc.). In such embodiments, the enterprise system may comprise an authentication server, and classifying the given detected transaction in step 208 utilizing the combined model generated in step 204 may comprise classifying the given detected transaction as one of genuine (e.g., benign) and fraudulent (e.g., potentially malicious).

In still other embodiments, the transactions of the designated type may comprise data transfer transactions (e.g., uploads to the enterprise system, downloads from the enterprise system to client devices, etc.). In such embodiments, the enterprise system may comprise a file server, and classifying the given detected transaction in step 208 utilizing the combined model generated in step 204 may comprise classifying the given detected transaction as one of potentially malicious (e.g., a virus, malware, adware, etc.) or benign.

It should be appreciated that embodiments are not limited solely to generating combined models for classifying financial transactions, user authentication transactions or data transfer transactions. Various other examples are possible, including but not limited to messaging transactions (e.g., emails, instant messages, etc.), contributions to collaborative documents (e.g., to cloud-based systems that provide a plurality of users of client devices to edit documents stored on an enterprise system), transfers or movement of goods or information for counterfeit detection in a supply chain, etc.

Today, consumers expect frictionless digital services in all aspects of their lives. This trend has impacts on a variety of industries. While various embodiments are described below in the context of the banking industry or more generally financial institutions, it should be appreciated that embodiments are not limited to this specific enterprise type, and may instead be used by enterprises in various other enterprises and application areas or domains.

In the banking industry, banks and other financial institutions and enterprises are constantly investing in order to deal with the challenges of embracing digitalization. In addition to traditional channels for interaction with customers and other users, financial technology companies and startups are thriving globally and rising to the challenges of providing consumers with frictionless digital banking services.

On top of consumer demand for digitalizing banking and other services, new regulations are also causing an increase of digital transactions. For example, recent regulation around the "API Economy" (e.g., management of an organization's digital services and assets through APIs in a controlled way) and open banking (e.g., the European Union (EU)'s Payment Services Directive (PSD) 2), requires banks to provide financial technology companies with access to bank accounts and other resources, etc. Such regulations are a significant shift from the past, where banking and other financial information was typically held in closed systems under the control of the financial institutions themselves. The API Economy enables the use of IoT technologies to perform transactions on a user's behalf to enable more and diverse interaction with financial accounts. Ease of access is further amplified, and it is expected that Human-Not-Present transactions will grow.

With new emerging technologies and regulation, there is an increase in transaction volume as well as new and additional channels for users to interact with banks and other financial institutions. Open banking regulations may create new API "channels" which move banking services into a Banking as a Service (BaaS) model. This expansion, in turn, is expected to generate significant growth in transaction volumes and payment activities.

These new banking channels may soon become a significant portion of traffic for financial institutions, and there is a need for techniques to protect such traffic from fraud and other types of security threats. As noted above, the Naïve Bayes framework is a useful algorithm for fraud detection, but it requires heavy modeling and prior knowledge of the data or input types. The performance of a Naïve Bayes algorithm may also depend heavily on the quality of input features. Illustrative embodiments provide techniques for applying the Naïve Bayes algorithm or other types of static models that require significant training for enterprises where new use cases are constantly emerging, often with new or different input data elements. Some embodiments therefore meet the need for creating customized features for use with a static core model (e.g., a Naïve Bayes framework) to account for different use cases.

In some embodiments, systems have the ability to provide risk assessment for emerging use cases by adopting an agnostic approach where the risk assessment is not limited to specific pre-defined data elements. Systems utilize algorithms that are open to receive and analyze diverse external data sources, and are not limited to a predefined set of input data from predefined use cases.

In the financial transactions domain, for example, there are various common core data elements that are relevant for most or all use cases, such as transaction amount, transaction beneficiary, source account, etc. Similarly, other domains or application areas may have input data elements that are considered "core" or relevant to most or all use cases within that domain or application area. Thus, some embodiments combine a core model with a dynamic model.

The core model utilizes a set of basic "core" features (e.g., features that are generic to most or all use cases). The predictors and associated structure in the core model are fixed and based on predefined data and domain knowledge for the relevant domain or application area.

The dynamic model is created based on custom data elements that vary according to the relevant use case in a particular domain or application area. The features used in the dynamic model are created automatically, and will be integrated alongside the core model. Additional details regarding generation of the dynamic model will be provided below.

The dynamic model scheme may be based on: (i) numeric features discretization; (ii) automatic feature creation; and (iii) automatic feature selection. Various models, such as multinomial Naïve Bayes models, use discrete features. In order to convert continuous numerical data to discrete values, some form of discretization is utilized. In some embodiments, entropy-based discretization is used. Entropy is a measure of how uniformly the data in a data set is distributed. In the financial transactions domain, entropy-based discretization may examine all possible cutoffs of continuous data, and select the cutoff with the highest distinction between fraudulent and genuine classes. Equation (1) below shows a measure of entropy:

$$\text{Entropy}(S) = P(S|F) \cdot \log(S|F) P(S|G) \cdot \log(S|G) \quad (1)$$

where S denotes the continuous data set, F represents fraudulent transactions, and G represents genuine transactions. Equation (2) below shows a measure of the gain achieved by a particular cutoff or split in the data:

$$\text{Gain}(S, A) = \text{Entropy}(S) - \sum_{v \in A} \frac{|S_v|}{|S|} \text{Entropy}(S_v) \quad (2)$$

where A denotes a particular discretization or splitting of continuous data to discrete values, v denotes a "bin" or split in the discretization A, and $S_v$ denotes the continuous data in a particular split v. In other words, the entropy of splitting the continuous data set S into multiple bins v in accordance with discretization or cutoff A is equal to a sum of the proportion of each bin's size multiplied by that bin's entropy.

FIG. 3 illustrates an example of entropy-based discretization. In the FIG. 3 example, the continuous numerical data set 301 (e.g., S) of a feature has 8 values. After entropy-based discretization defining a threshold of information gain below which further splitting is stopped, the continuous numerical data set 301 is split into bins 303-1, 303-2 and 303-3, collectively bins 303 (e.g., bins v∈A).

It should be appreciated that approaches for numeric feature discretization are not limited to entropy-based approaches. For example, some embodiments may utilize error-based or other approaches for numeric features discretization, or combinations of entropy-based and other approaches for numeric features discretization.

After numeric features discretization, automatic feature creation is performed. Automatic feature creation, in some embodiments, is achieved by creating a set of generic profiles on top of the discretized numeric data and categorical data. The generic profiles may be created based on predefined logic that is proven to be efficient. The predefined logic may be domain or application area dependent (e.g., may be created or generated based on domain expert knowledge or a knowledge base associated with the particular domain or application area).

In the financial transactions domain, the generic profiles may include one or more of: the accumulated amount of money transfers performed by a user in or at a specific location (e.g., at a particular automated teller machine (ATM), branch or office of a financial institution, etc.); whether it is the first time the user is using a particular device to perform a particular transaction (e.g., whether it is the first time a user utilizes a mobile device for performing a call center transaction, etc.); the number of users that utilize a particular device (e.g., a mobile device); known risky merchants, financial technology applications, or other entities; etc. It should be appreciated that these profiles are provided by way of example only, and that embodiments are not limited to use with these profiles for automatic feature creation in the financial transactions domain.

Following automatic feature creation, automatic feature selection is performed. After automatic feature creation, there are a number of new features and many possible combinations of such features to use for modeling. One option would be to test model performance using all combinations of such features. This option, however, is expensive in terms of time and resources required as exhausting all possible combinations requires time and resources which increase exponentially with the number of features. As a result, some embodiments utilize evaluation processes that determine the most valuable features, both when combined with one another and when combined with the core model.

In some embodiments, a wrapper method is used for automatic feature selection. It should be appreciated, however, that in other embodiments other methods may be used, such as filter-based methods and embedding methods. For the wrapper method for automatic feature selection, the generated subset of features at each iteration is done via a heuristic search algorithm. More particularly, some embodiments utilize a genetic algorithm for the heuristic search. Genetic algorithms are a set of algorithms that mimic the process of natural selection by iteratively creating enhanced solutions. As a result, genetic algorithms are able to find the best solution or a good approximation of the best solution. In the financial transactions domain, the solution would be a subset of the automatically created features with high fraud correlation useful in determining whether particular transactions are fraudulent.

Figure 4:
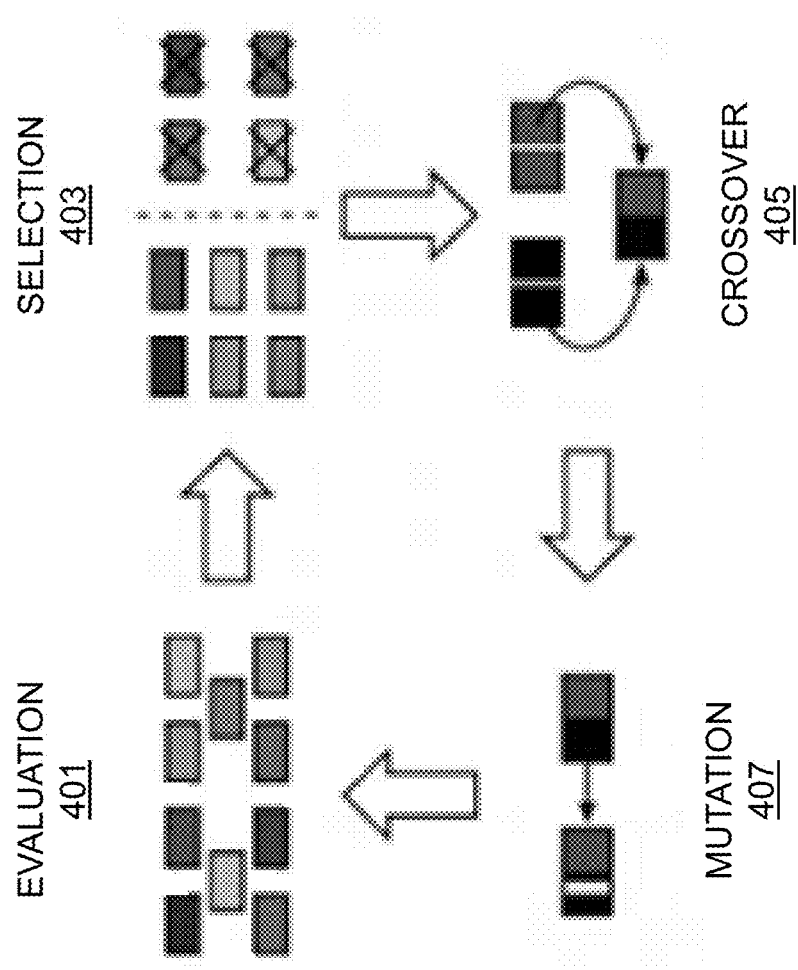
FIG. 4 depicts a cycle of a genetic algorithm in an illustrative embodiment.

Let $x \in R^k$ be a binary vector representing k additional features from which it is desired to select a subset for use in the dynamic model that supplements the core model. In the binary vector x, an entry $x_j$ is set to 1 if the j th entry is active in the current iteration and 0 if it is not active in the current iteration. The cycle of the genetic algorithm will be described in conjunction with FIG. 4. Initially, m random vectors are drawn, and the model performance is evaluated 401 by testing on the m models that are generated when combining the core model with the features active for each of the m vectors. Next, selection 403 is performed by taking the best n m vectors and applying crossover 405. In crossover 405, new solutions are generated by pairing the set of selected n vectors in order to create 1 combinations. Afterwards, per each vector (e.g., the original n vectors and the 1 combinations), mutation 407 is applied where with probability p features are activated and deactivated. This process of evaluation 401, selection 403, crossover 405 and mutation 407 is repeated for i iterations. Considering that the run time is controlled by the evaluation process 401, the run time upper bound is $O(1*i+m)$, compared to $O(2^k)$ when exhausting all options.

Advantageously, embodiments offer an automatic approach to using machine learning models that require heavy modeling prior to the training stage. These types of machine learning models require each new data input to be processed into numerous features. Afterwards, the new features must go through a process of feature selection to refine the model, and the entire process is time consuming and will often lead to suboptimal performance. The dynamic algorithm provided in some embodiments can provide improvements through processing new data inputs and automatically embedding these inputs to be used as part of the predictive model. Thus, embodiments offer a smooth adaptation to new data, avoiding the need for spending time and resources on modeling, profile creation and feature engineering by automating the process as described herein.

Figure 5A:
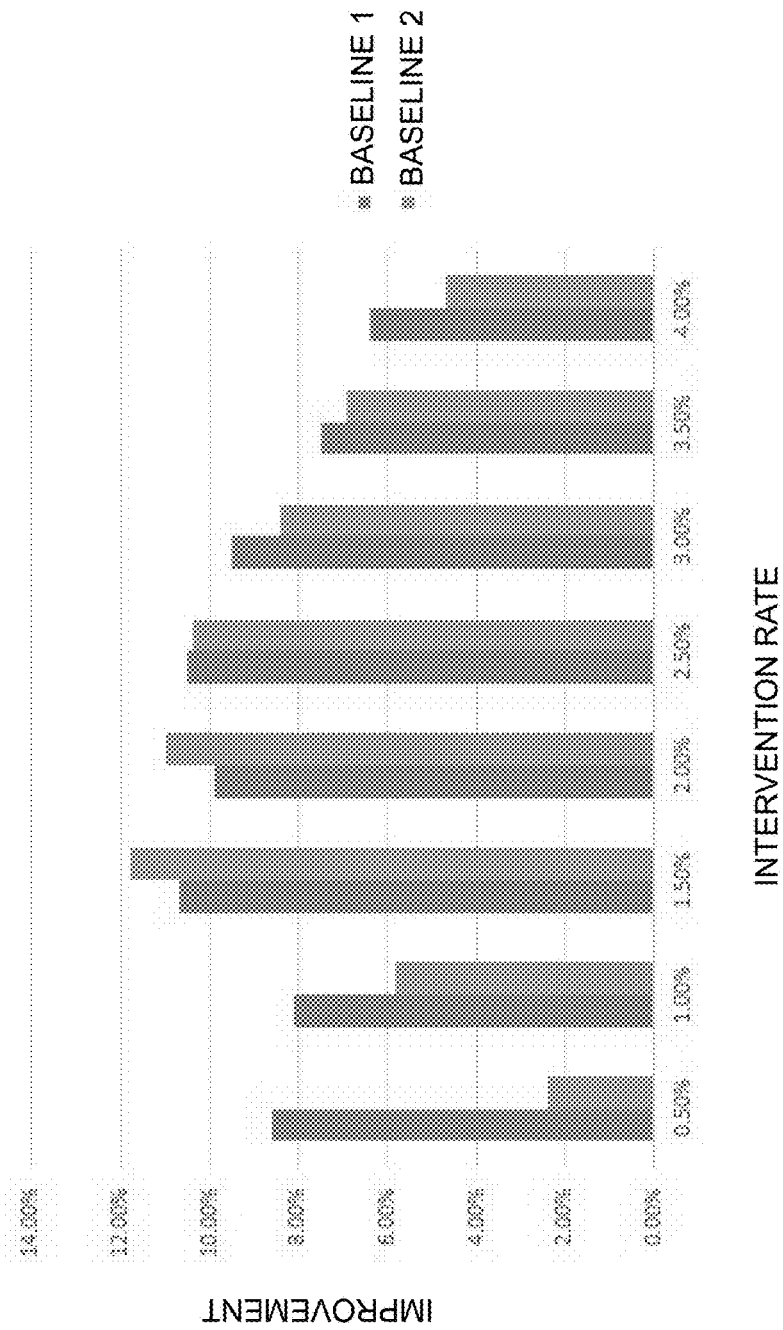
FIGS. 5A-5C depict plots illustrating improvement in fraud detection rate utilizing a combined model in an illustrative embodiment.
Figure 5B:
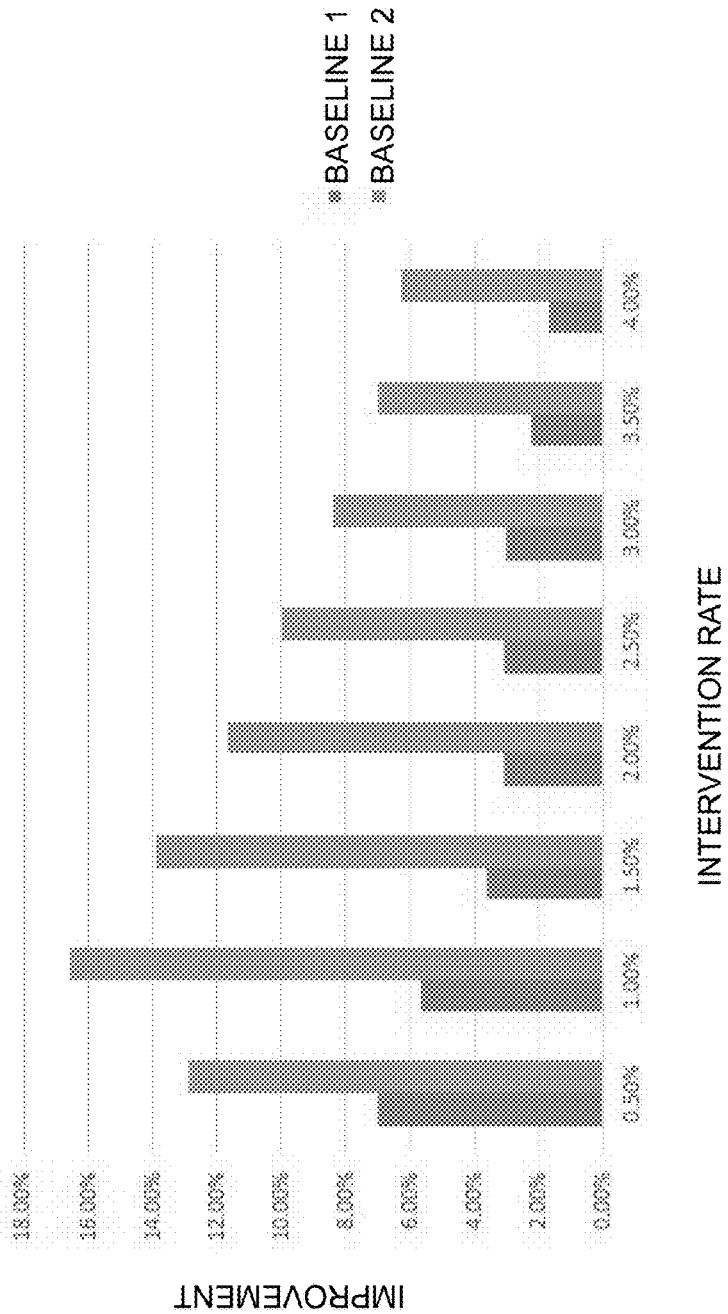
Figure 5C:
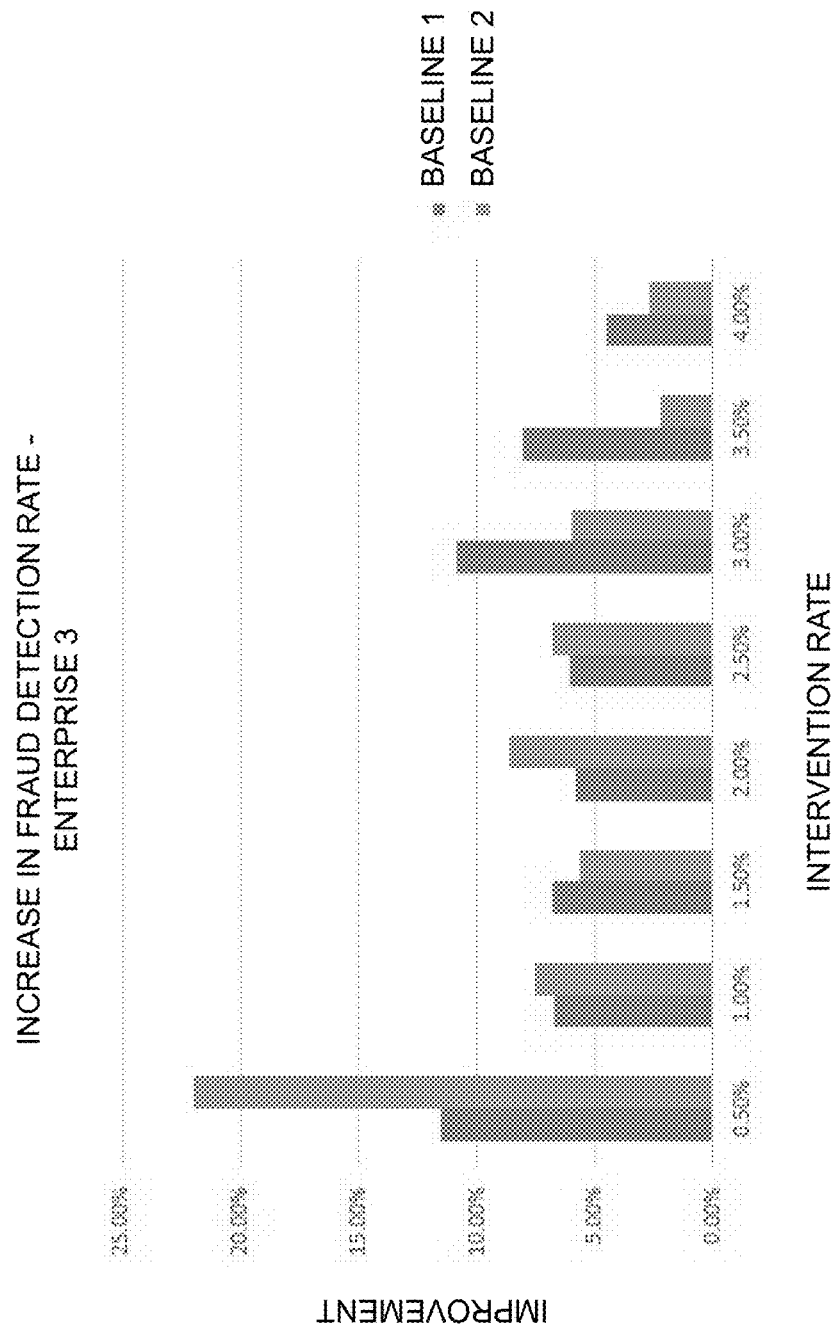

FIGS. 5A-5C illustrate application of the techniques described herein on three enterprises 1, 2 and 3 which utilize RSA® Adaptive Authentication for online banking and fraud detection. This system may utilize a Naïve Bayes classifier in order to classify transactions as either fraudulent or genuine. The Naïve Bayes classifier outputs a probability measuring how risky a particular transaction is. Since only a small portion of online banking transactions are fraudulent (e.g., approximately 0.03%), there is a constant balance between usability and security—the desire to detect fraudulent transactions while providing minimal disruption to genuine users.

Enterprise 1 is a United States regional bank, Enterprise 2 is a large bank operating in South America, and Enterprise 3 is a United States international bank. These enterprises may send various data for use in fraudulent transaction detection, yet not all of the data sent is modeled in the core model. FIGS. 5A, 5B and 5C show plots 501, 503 and 505 for Enterprises 1, 2 and 3, respectively, showing the improvement in fraud detection rate (FDR) across different intervention rates as compared to two baselines. Baseline 1 is generated using the core model without any automatically generated features as described herein. Baseline 2 is generated using the core model with all automatically generated features but with no smart or automatic feature selection as described herein. The FDR, also referred to as the true positive rate, is measured in percentage of how many of the top scored transactions from the classifier were fraudulent. The amount of top scored transactions (as reflected in the different thresholds), are defined by the Enterprises 1, 2 and 3 according to how sensitive such enterprises are to false positives. These thresholds are also called intervention rates, since the enterprises may want to intervene (e.g., deny or authenticate transactions that received a score on those thresholds). As can be seen from the plots 501, 503 and 505 of FIGS. 5A-5C, there is significant improvement in the FDR when using the additional data (e.g., the dynamic model as described herein). Further, the plots 501, 503 and 505 of FIGS. 5A-5C illustrate that using all of the features (e.g., skipping automatic or smart feature selection) may cause degradation in the fraud detection capabilities.

As described above, some embodiments utilize: (i) feature discretization (e.g., using entropy-based discretization techniques); (ii) automatic feature creation (e.g., smart profile and feature creation of the discretized data based on predefined logic); (iii) automatic feature selection (e.g., based on a genetic algorithm); and (iv) combination of a core model with a dynamic model (e.g., into a multinomial Naïve Bayes learner or other classifier). It should be appreciated, however, that each of (i)-(iv) may utilize various alternatives which may better fit the domain or application area of a particular implementation. For example, (i) feature discretization may be done with various alternatives to entropy-based approaches, some of which may fit the unsupervised case in which one does not have feedback. Uniform distribution discretization, as one alternative, does not rely on feedback. As another example, (iii) automatic feature selection may use techniques other than genetic algorithms, such as other wrapper, filter or embedded methods. A filter approach may be used in some embodiments to pick the best features according to the Area Under Curve-Receiver Operating Characteristic (AUC-ROC) of each feature. Further, the classifier used for (iv) is not limited or restricted to Naïve Bayes classifiers. In some embodiments, neural networks may be used which embed categorical features to a low dimensional-dense vector that captures contextual information. While embeddings are often used for natural language processing (NLP) tasks, their use is not restricted solely to NLP tasks. Therefore, some embodiments may discretize numeric features to embed them and choose the most beneficial features before introduction to a neural network used to perform classification.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for classifying transactions utilizing a combined model will now be described in greater detail with reference to FIGS. 6 and 7. Although described in the context of system 100, these platforms may also be used to implement at least portions of other information processing systems in other embodiments.

Figure 6:
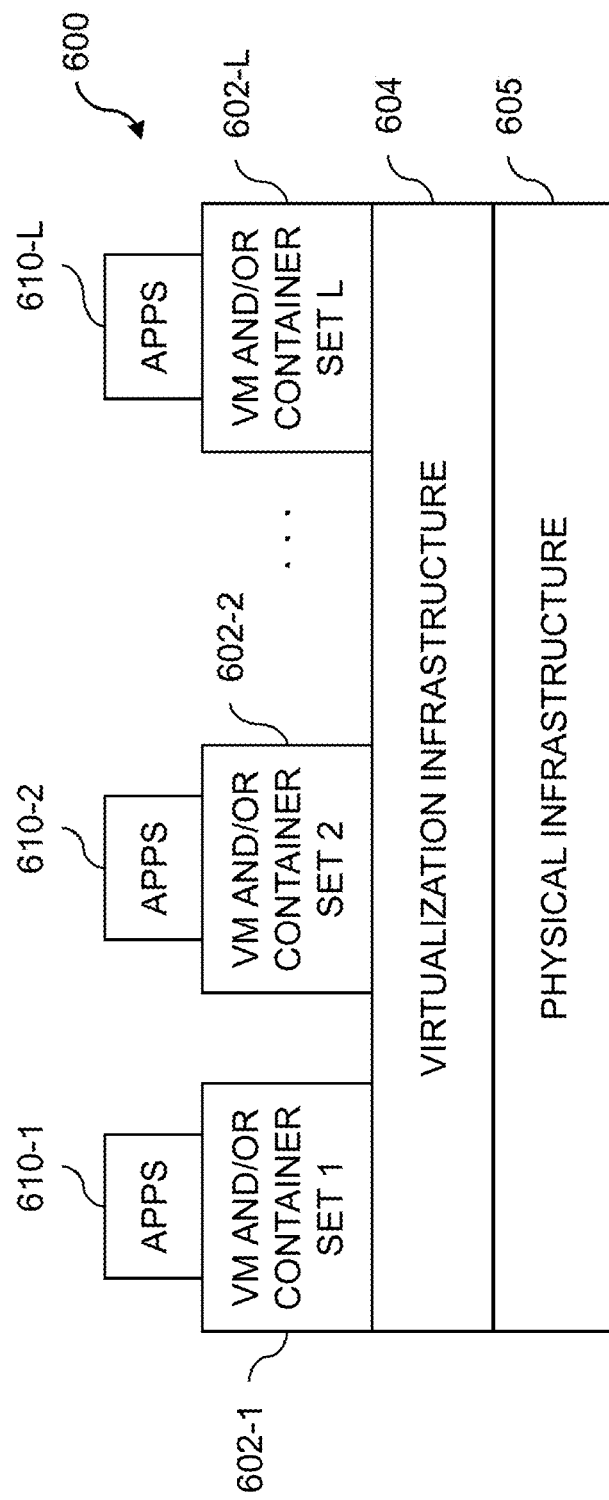
FIGS. 6 and 7 show examples of processing platforms that may be utilized to implement at least a portion of an information processing system in illustrative embodiments.
Figure 7:
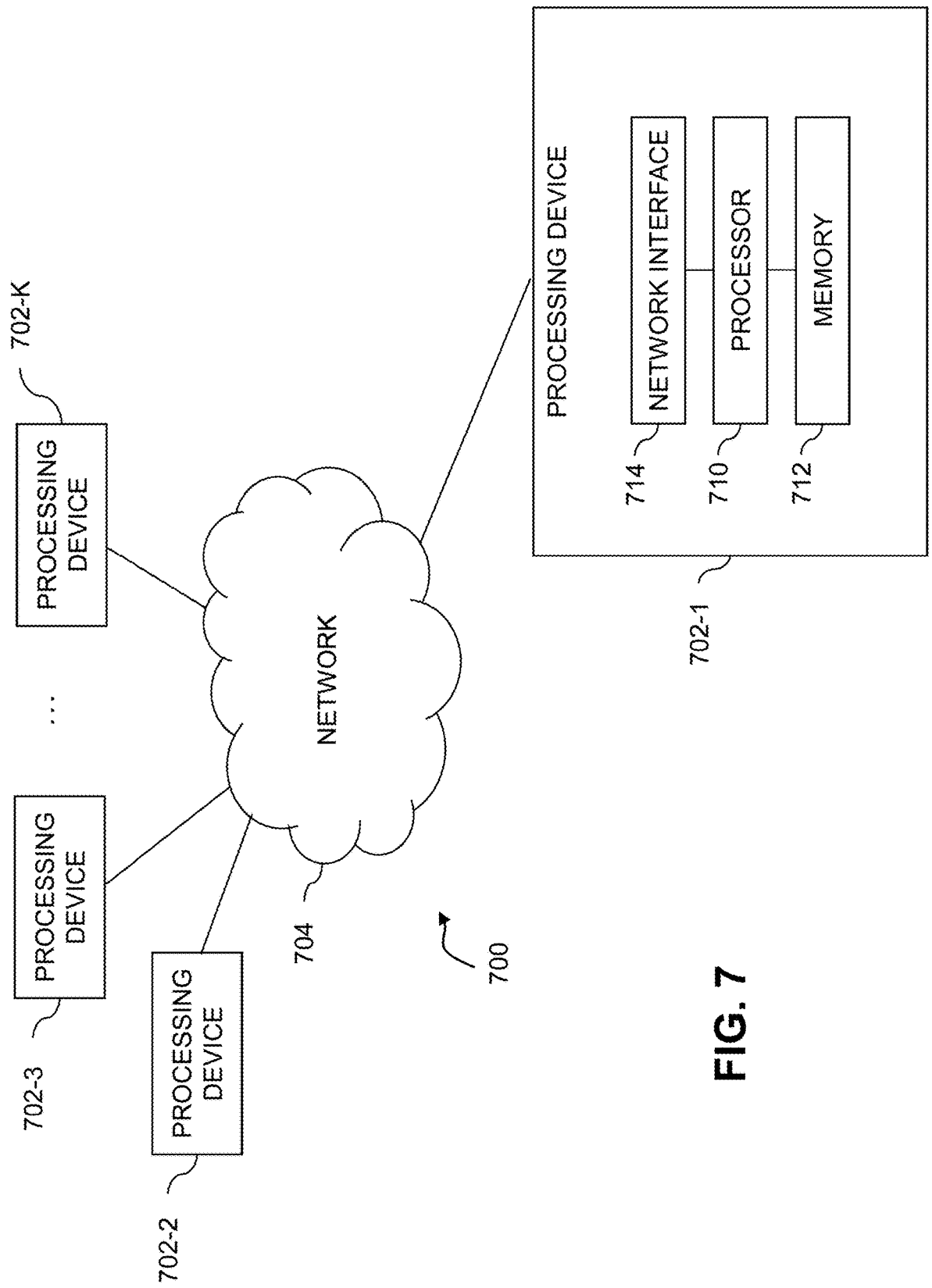

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for classifying transactions utilizing a combined model as disclosed herein are illustratively implemented in the form of software running on one or more processing devices. It should again be emphasized that the above-described embodiments are presented for purposes of illustration only. Many variations and other alternative embodiments may be used. For example, the disclosed techniques are applicable to a wide variety of other types of information processing systems, transaction types, predefined and dynamic input data, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   generating a static model for classifying transactions of a designated type, the static model being trained using predefined input data corresponding to a first set of features, the first set of features being generic to transactions of the designated type;
   generating a dynamic model for classifying transactions of the designated type, the dynamic model being trained using dynamic input data corresponding to a second set of features, the second set of features being specific to one or more subsets of transactions of the designated type;
   combining the static model and the dynamic model to generate a combined model for classifying transactions of the designated type;

detecting one or more transactions of the designated type between one or more client devices and an enterprise system;

classifying, utilizing the combined model, a given one of the detected one or more transactions between a given one of the one or more client devices and the enterprise system as one of potentially malicious and benign; and modifying processing, by at least one of the given one of the one or more client devices and the enterprise system, of the given one of the detected one or more transactions responsive to classifying the given one of the one or more detected transactions as potentially malicious;

wherein the method is performed by at least one processing device comprising a processor coupled to a memory.

2. The method of claim 1 wherein the transactions of the designated type comprise financial transactions, the enterprise system comprises one or more financial institutions, and wherein classifying the given one of the detected one or more transactions utilizing the combined model as one of potentially malicious and benign comprises classifying the given one of the detected one or more transactions as one of fraudulent and genuine.

3. The method of claim 1 wherein the dynamic input data is obtained from one or more application programming interfaces associated with one or more Internet of Things (IoT) channels for communication between the one or more client devices and the enterprise system.

4. The method of claim 1 wherein the combined model utilizes a Multinomial Naïve Bayes algorithm.

5. The method of claim 1 wherein the combined model comprises a neural network machine learning model.

6. The method of claim 1 wherein generating the dynamic model comprises:

obtaining the dynamic input data, the dynamic input data comprising: (i) categorical data; and (ii) continuous numerical data associated with a set of transactions of the designated type; and discretizing the continuous numerical data to generate discretized numeric data.

7. The method of claim 6 wherein discretizing the continuous numerical data comprises utilizing entropy-based discretization to select a given set of cutoffs in the continuous numerical data with a highest distinction between first and second classes of transactions of the designated type.

8. The method of claim 7 wherein the first class of transactions of the designated type comprise benign transactions and the second class of transactions of the designated type comprise potentially malicious transactions.

9. The method of claim 7 wherein the entropy-based discretization analyzes two or more different sets of cutoffs and utilizes an information gain measure to select the given set of cutoffs which provides a greatest reduction in entropy.

10. The method of claim 1 wherein generating the dynamic model comprises generating a new set of features using the dynamic input data based at least in part on a set of generic profiles for transactions of the designated type.

11. The method of claim 10 wherein the set of generic profiles are determined using at least one of domain expert knowledge for transactions of the designated type and a knowledge base for transactions of the designated type.

12. The method of claim 10 wherein generating the dynamic model further comprises selecting a subset of the generated new set of features as the second set of features based at least in part on a determination of which of the new set of features when combined together and with the first set of features improve accuracy of classification of transactions of the designated type.

13. The method of claim 12 wherein selecting the subset of the generated new set of features as the second set of features comprises utilizing at least one of a filter approach, a wrapper approach and an embedding approach.

14. The method of claim 13 wherein selecting the subset of the generated new set of features as the second set of features comprises utilizing the wrapper approach with a genetic algorithm, the genetic algorithm comprising performing two or more iterations of:

evaluating performance of the static model combined with a plurality of different subsets of the generated new set of features;

selecting two or more of the subsets of the generated new set of features based at least in part on the evaluated performance;

applying crossover between the two or more selected subsets of the generated new set of features to generate one or more new subsets of the generated new set of features;

performing mutation by selectively activating and deactivating respective ones of the features in the two or more selected subsets of the generated new set of features and the one or more new subsets of the generated new set of features; and replacing the plurality of different subsets of the generated new set of features with the mutated two or more selected subsets of the generated new set of features and the one or more new subsets of the generated new set of features.

15. A computer program product comprising a non-transitory processor-readable storage medium having stored therein program code of one or more software programs, wherein the program code when executed by at least one processing device causes the at least one processing device:

to generate a static model for classifying transactions of a designated type, the static model being trained using predefined input data corresponding to a first set of features, the first set of features being generic to transactions of the designated type;

to generate a dynamic model for classifying transactions of the designated type, the dynamic model being trained using dynamic input data corresponding to a second set of features, the second set of features being specific to one or more subsets of transactions of the designated type;

to combine the static model and the dynamic model to generate a combined model for classifying transactions of the designated type;

to detect one or more transactions of the designated type between one or more client devices and an enterprise system;

to classify, utilizing the combined model, a given one of the detected one or more transactions between a given one of the one or more client devices and the enterprise system as one of potentially malicious and benign; and to modify processing, by at least one of the given one of the one or more client devices and the enterprise system, of the given one of the detected one or more transactions responsive to classifying the given one of the one or more detected transactions as potentially malicious.

16. The computer program product of claim 15 wherein the combined model utilizes a Multinomial Naïve Bayes algorithm.

17. The computer program product of claim 15 wherein the dynamic input data is obtained from one or more application programming interfaces associated with one or more Internet of Things (IoT) channels for communication between the one or more client devices and the enterprise system.

18. An apparatus comprising:
at least one processing device comprising a processor coupled to a memory;
the at least one processing device being configured:
to generate a static model for classifying transactions of a designated type, the static model being trained using predefined input data corresponding to a first set of features, the first set of features being generic to transactions of the designated type;
to generate a dynamic model for classifying transactions of the designated type, the dynamic model being trained using dynamic input data corresponding to a second set of features, the second set of features being specific to one or more subsets of transactions of the designated type;
to combine the static model and the dynamic model to generate a combined model for classifying transactions of the designated type;
to detect one or more transactions of the designated type between one or more client devices and an enterprise system;
to classify, utilizing the combined model, a given one of the detected one or more transactions between a given one of the one or more client devices and the enterprise system as one of potentially malicious and benign; and
to modify processing, by at least one of the given one of the one or more client devices and the enterprise system, of the given one of the detected one or more transactions responsive to classifying the given one of the one or more detected transactions as potentially malicious.

19. The apparatus of claim 18 wherein the combined model utilizes a Multinomial Naïve Bayes algorithm.

20. The apparatus of claim 18 wherein the dynamic input data is obtained from one or more application programming interfaces associated with one or more Internet of Things (IoT) channels for communication between the one or more client devices and the enterprise system.

* * * * *